United States Patent

Miettinen

[11] Patent Number: 6,147,887
[45] Date of Patent: Nov. 14, 2000

[54] INVERTER UTILIZING A BOOTSTRAP METHOD

[75] Inventor: Erkki Miettinen, Helsinki, Finland

[73] Assignee: ABB Industry OY, Helsinki, Finland

[21] Appl. No.: 09/420,757

[22] Filed: Oct. 20, 1999

[30] Foreign Application Priority Data

Oct. 26, 1998 [FI] Finland ................................ 982313

[51] Int. Cl.[7] .............................. H02M 3/24; H02M 5/42
[52] U.S. Cl. ............................................ 363/98; 363/133
[58] Field of Search .................................. 363/95, 97, 98, 363/17, 16, 131, 132, 133

[56] References Cited

U.S. PATENT DOCUMENTS

| | | | |
|---|---|---|---|
| 4,432,032 | 2/1984 | Baker et al. ............................ | 363/132 |
| 4,629,905 | 12/1986 | Kraicar ................................. | 307/72 |
| 4,908,551 | 3/1990 | Ludikhuize et al. ................. | 315/209 R |
| 5,182,479 | 1/1993 | Behagel et al. ...................... | 327/379 |
| 5,225,742 | 7/1993 | Beasley ............................... | 315/307 |
| 5,349,157 | 9/1994 | Blankenship ........................ | 323/258 |
| 5,351,175 | 9/1994 | Blankenship ........................ | 363/16 |
| 5,365,118 | 11/1994 | Wilcox ................................. | 327/109 |
| 5,627,460 | 5/1997 | Bazine et al. ....................... | 323/288 |
| 5,744,878 | 4/1998 | Wachter ............................... | 307/130 |
| 5,886,543 | 3/1999 | Moody .................................. | 327/77 |

FOREIGN PATENT DOCUMENTS 196 17 832
A1 11/1996 Germany ................. H02M 1/08

Primary Examiner—Peter S. Wong
Assistant Examiner—Bao Q. Vu
Attorney, Agent, or Firm—Dykema Gossett PLLC

[57] ABSTRACT

An inverter has a direct voltage intermediate circuit having a positive (Udc+) and a negative (Udc−) voltage busbar, and an auxiliary voltage source (1) which generates auxiliary voltages (U1, U2, U3) referenced to the positive (Udc+) and the negative (Udc−) voltage busbar of the direct voltage intermediate circuit. The inverter also has for each phase an upper (2) and a lower (3) power semiconductor, connected in series between the positive and the negative voltage busbar. The point between the semiconductors forms the phase output (Uout) of the inverter. An upper (4) and lower (5) gate driver outputs (8,9) are connected to the control electrode (G) of the respective upper (2) and lower (3) power semiconductors which have a positive (6) and a negative (7) auxiliary voltage input and a zero potential point (Com) connected to the output electrode (E) of the power semiconductor to be controlled. A first diode (D1) has its anode connected to the positive auxiliary voltage (U2) and its cathode connected to the positive auxiliary voltage input (6) of the upper gate driver (4). A first capacitor (C1) is connected between the positive auxiliary voltage input (6) of the upper gate driver (4) and the zero potential point (Com). The inverter also has for each phase another diode (D2), its anode being connected to the negative auxiliary voltage input (7) of the upper gate driver and its cathode being connected to the negative auxiliary voltage (U3). Another capacitor (C2) is connected between the negative auxiliary voltage input (7) and the zero potential point.

2 Claims, 1 Drawing Sheet

INVERTER UTILIZING A BOOTSTRAP METHOD

BACKGROUND OF THE INVENTION

The invention relates to an inverter which comprises a direct voltage intermediate circuit consisting of a positive and a negative voltage busbar, and an auxiliary voltage source which generates auxiliary voltages referenced to the positive and the negative voltage busbar of the direct voltage intermediate circuit, the inverter also comprising for each phase an upper and a lower power semiconductor, which are connected in series between the positive and the negative voltage busbar, the point between the semiconductors forming the phase output of the inverter; an upper and a lower gate driver the outputs of which are connected to the control electrode of the respective upper and lower power semiconductors and which comprise a positive and a negative auxiliary voltage input and a zero potential point, which is connected to the output electrode of the power semiconductor to be controlled; a first diode the anode of which is connected to the positive auxiliary voltage referenced to the negative voltage busbar and the cathode the positive auxiliary voltage input of the upper gate driver; and a first capacitor which is connected between the positive auxiliary voltage input of the upper gate driver and the zero potential point.

The main circuit of inverters typically consists of a direct voltage intermediate circuit and semiconductor switches connected to it, which are usually FET or IGBT switches. The semiconductor pair connected in series between the positive and the negative voltage busbar of the intermediate circuit forms the phase output of the inverter. The number of such pairs in the inverter depends on the number of output phases, i.e. there is a separate output for each output phase. The semiconductor switches can be used for connecting the voltage of either the positive or the negative voltage busbar to the load connected to the output of the inverter. By connecting voltage pulses to the output the load can be provided with the voltage required at a given time, the amplitude and frequency of which are changeable.

The semiconductors of inverters are controlled by means of gate drivers connected to the control electrode of the semiconductor switches. Depending on the component, the control electrode may be called a gate or a base, for example. The gate drivers generate the necessary current or voltage pulses for the control electrode of the switch, and thus the switch can change over to the conducting state reliably. It is difficult to generate the auxiliary voltage needed by the gate drivers cost-effectively since particularly the potential of the output electrode of the power semiconductor (referred to as an upper semiconductor component in the text) connected to the positive voltage busbar varies considerably as the state of the other power semiconductor changes. The output electrode is called e.g. an emitter or a source, the name varying according to the type of component. Positive turn-on voltage of the upper semiconductor component can be generated using a method known as a bootstrap method, in which positive turn-on voltage is produced from the positive voltage referenced to the negative voltage busbar, in other words, from voltage of a certain magnitude with respect to the negative voltage busbar of the intermediate circuit. In the bootstrap method the upper gate driver receives positive auxiliary voltage through the diode connected to the gate driver when the power semiconductor connected to the negative voltage busbar is in the conducting state. This way it is possible to generate the positive auxiliary voltage which is required by the gate driver and used for igniting the switching component. In low-current power semiconductors the switching component has typically been turned off by connecting the gate to the emitter potential of the component through the base resistance.

If the power semiconductor is intended for high currents, the gate driver must be able to generate a turn-off voltage which is negative with respect to the emitter of the semiconductor. When negative turn-off voltage is used, the component can be made to cut off the passing current quicker. Furthermore, by keeping the gate in the negative potential with respect to the emitter it is possible to prevent unintentional turn-on of the component, which could otherwise be caused by high change rates of the voltage over the component. Changes of the voltage over the component result from state changes of other power semiconductors. In the case of the IGBT, turn-on caused by voltage changes results from rapid change of the internal gate charge due to the influence of the Miller capacitance. Such unintentional turn-on lasts only for a few dozens of nanoseconds during which a high current peak passes through the component, which leads to increased power loss in the power switch. To prevent this phenomenon, the gate of the component must be kept in a negative potential of at least about 5 volts with respect to the emitter when the component is off.

In high-current power semiconductors the negative auxiliary voltage of the upper gate driver is produced for the gate driver using separate transformers or transformer coils for each output phase of the inverter. Such transformers should also withstand the high change rate of the voltage between their primary and secondary coils.

BRIEF DESCRIPTION OF THE INVENTION

The object of the present invention is to provide an inverter in which the above-mentioned disadvantages are eliminated and which enables generation of output voltage by means of a simpler structure and with smaller power losses. This object is achieved with an inverter of the invention which is characterized in that the inverter also comprises for each phase another diode, the anode of which is connected to the negative auxiliary voltage input of the upper gate driver and the cathode to the negative auxiliary voltage referenced to the positive busbar, and another capacitor which is connected between the negative auxiliary voltage input and the zero potential point of the upper gate driver.

The inverter according to the invention is based on the idea that negative auxiliary voltage is generated for the gate driver of the power semiconductor connected to the positive voltage busbar of the intermediate circuit by the bootstrap method using negative voltage referenced to the positive current busbar and a diode connected to it. By means of the invention the upper power semiconductor can be switched off and kept switched off by using a gate voltage which is negative with respect to the emitter. The invention decreases component costs compared to prior art solutions because only one transformer is needed to generate a negative direct voltage with respect to the positive voltage busbar of the intermediate circuit, and one diode per each output phase of the inverter.

BRIEF DESCRIPTION OF THE DRAWINGS

The invention will be described more closely by means of preferred embodiments with reference to the accompanying drawing, in which FIG. 1 schematically illustrates one output phase of an inverter according to the invention.

DETAILED DESCRIPTION OF THE INVENTION

Figure 1:
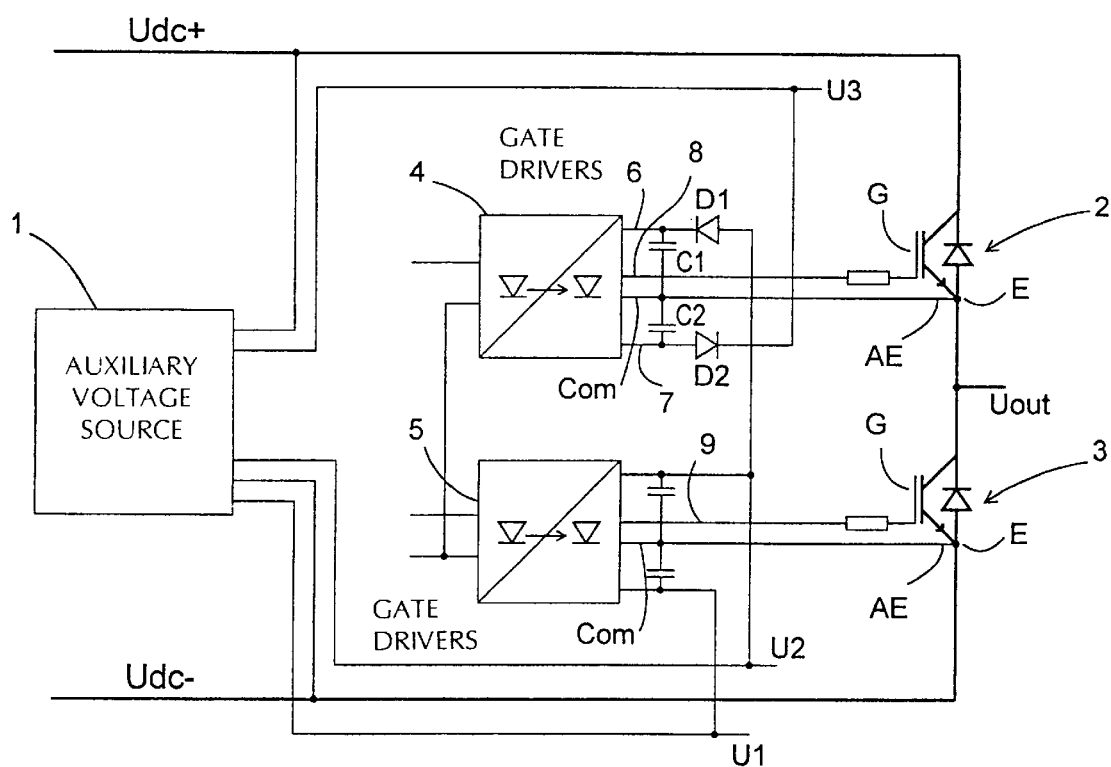

The inverter of the invention illustrated in FIG. 1 comprises a voltage intermediate circuit consisting of a positive Udc+ and a negative Udc− busbar. Voltage is generated in the busbars e.g. by rectifying the alternating voltage of electric supply network. FIG. 1 illustrates only one of the possible output phases of the inverter. All output phases are similar to one another, and in the most typical cases there are three output phases, and thus the inverter can be used for producing 3-phase output voltage the amplitude and frequency of which can be changed as required. The output voltage is generated by means of power semiconductors 2, 3, such as IGBT, by connecting alternately the voltage of the negative voltage busbar and the voltage of the positive voltage busbar to the phase output using switch components 2, 3 connected in series with each other. In this text IGBT swithces are used as examples of semiconductor components 2, 3, and thus the control electrodes G of the switches are called gates and the output electrodes E emitters. The output voltage Uout is alternately as high as the voltage of the positive voltage busbar and as high as that of the negative voltage busbar.

The inverter according to the invention also comprises an auxiliary voltage source 1 which generates auxiliary voltages U1, U2, U3 referenced to the positive and the negative voltage busbar of the inverter. The auxiliary voltages U1, U2 are referenced to the negative voltage busbar Ucd− so that the first auxiliary voltage U1 is negative with respect to it. In other words, the potential of the negative voltage busbar is higher than that of the first auxiliary voltage. The voltage between the first auxiliary voltage and the negative voltage busbar is −8.5 volts, for example. The second auxiliary voltage U2 is also referenced to the negative voltage busbar Ucd−, while the auxiliary voltage is positive with respect to the busbar. The difference in potential between the auxiliary voltage U2 and the voltage busbar is +17.5 volts, for example. The third auxiliary voltage U3 is referenced to the positive voltage busbar Udc+ of the intermediate voltage circuit instead. The auxiliary voltage U3 is negative with respect to the busbar Udc+ and the difference in potential is −8.5 volts, for example.

The purpose of the auxiliary voltages U1, U2, U3 is to produce auxiliary voltages needed by the gate drivers 4, 5 so that semiconductor components 2, 3 can be controlled reliably. The gate drivers 4, 5 illustrated in FIG. 1 are provided with optoisolation, and inside the gate driver a low-level control signal is converted into a light signal, which is then converted into a higher-level voltage output which controls the switches and for which the auxiliary voltages are needed. The gate driver 5, which is arranged to control the lower switch, i.e. the power switch 3, whose emitter is connected to the negative voltage busbar of the intermediate voltage circuit, receives its auxiliary voltage input directly from the auxiliary voltages U1, U2 referenced to the negative busbar. When the semiconductor switch 2, 3 is rendered to the conducting state, the gate of the switch should be in the positive potential with respect to the emitter of the switch. For this reason, the auxiliary emitter couplings AE of the emitters of the switches 2, 3 are connected to the zero potential Com of the gate drivers. The auxiliary emitters are coupled to the same point as the actual emitters of the components. This allows to control the semiconductor switch 3 reliably by means of the gate driver 5 so that when the switch 3 is rendered to the conducting state, positive auxiliary voltage of the gate driver is supplied to the output 9 of the gate driver. Since the output 9 is connected to the gate of the switch to be controlled, the voltage between the gate G and the emitter E of the switch will be as high as the positive auxiliary voltage U2. Correspondingly, when the switch 3 is rendered to the non-conducting state, the auxiliary voltage U1 of the gate driver will be supplied to the output of the gate driver, and the voltage of the gate of the switch 3 is negative with respect to the emitter E, and consequently the switch is turned off reliably. In the manner described above the function of the lower switch component 3 is simple because the emitter of the switch is stably and continuously in the potential of the negative voltage busbar Udc−.

According to FIG. 1, the first diode D1 is connected between the auxiliary voltage U2 of the positive auxiliary voltage input 6 of the gate driver 4, i.e. the upper gate driver. The purpose of the diode D1 is to produce positive auxiliary voltage 4 for the gate driver 4 when the lower semiconductor switch 3 is in the conducting state. When the semiconductor switch 3 is in the conducting state, both the phase output Uout and the emitter of the switch 2 are in the potential of the negative voltage busbar. In that case the auxiliary voltage U2 has a higher potential than the emitter or auxiliary emitter of the switch 2, and current can pass through the diode D1, thus charging a capacitor C1 connected between the positive auxiliary voltage input 6 and the zero potential Com of the gate driver and producing positive auxiliary voltage for the upper gate driver 4. The positive auxiliary voltage can be used in the manner described above for generating a positive voltage between the gate G and the emitter E of the switch. Such previously known generation of auxiliary voltage from the auxiliary voltage referenced to the negative voltage busbar is called a bootstrap method.

According to the invention, there is a diode D2 connected between the auxiliary voltage U3 and the negative auxiliary voltage input of the gate driver 4, as illustrated in FIG. 1. The purpose of the diode is to produce negative auxiliary voltage for the gate driver 4 when the semiconductor switch 2 is in the conducting state. When the switch 2 conducts, the potential of the phase output Uout is almost equal to the potential of the positive voltage busbar Udc+, and thus the potential of the emitter 2 and auxiliary emitter AE of the switch 2 is higher than that of the auxiliary voltage U3. Thanks to the difference in potential, the diode D2 can change over to the conducting state, and the capacitor C2, which is connected between the zero potential Com of the gate driver 4 and the negative auxiliary voltage input 7, is charged and simultaneously the gate driver receives its negative auxiliary voltage. The gate driver needs the negative voltage for turning the switch 2 off and keeping it turned off, as was explained above. The switch is turned off reliably by guiding the gate G of the switch to the voltage negative with respect to the emitter E.

It is obvious to a person skilled in the art that, as technology develops, the inventive concept can be implemented in various ways. The invention and its embodiments are thus not limited to the examples described above, but may vary within the scope of the claims.

What is claimed is:

1. An inverter which comprises
   a direct voltage intermediate circuit consisting of a positive and a negative voltage busbar, and
   an auxiliary voltage source which generates auxiliary voltages referenced to the positive and the negative voltage busbar of the direct voltage intermediate circuit, the inverter also comprising for each phase an upper and a lower power semiconductor, which are connected in series between the positive and the negative voltage busbar, the point between the semiconductors forming the phase output of the inverter, an upper and a lower gate driver the outputs of which are connected to the control electrode of the respective upper and lower power semiconductors and which comprise a positive and a negative auxiliary voltage input and a zero potential point, which is connected to the output electrode of the power semiconductor to be controlled, a first diode the anode of which is connected to the positive auxiliary voltage referenced to the negative voltage busbar and the cathode to the positive auxiliary voltage input of the upper gate driver, and a first capacitor which is connected between the positive auxiliary voltage input of the upper gate driver and the zero potential point (Com), wherein the inverter also comprises for each phase another diode the anode of the which is connected to the negative auxiliary voltage input of the upper gate driver and the cathode to the negative auxiliary voltage referenced to the positive busbar, and another capacitor which is connected between the negative auxiliary voltage input and the zero potential point of the upper gate driver.

2. An inverter having a plurality of phases comprising:

a direct voltage intermediate circuit including a positive busbar and a negative voltage busbar, and an auxiliary voltage source for generating a positive auxiliary voltage referenced to the positive busbar and a negative auxiliary voltage referenced to the negative voltage busbar, each phase including an upper power semiconductor and a lower power semiconductor each having a corresponding control electrode and an output electrode connected in series between the positive busbar and the negative busbar and having a connection point therebetween forming a corresponding phase output of the inverter, an upper gate driver and a lower gate driver having outputs connected to the control electrode of the respective upper and lower power semiconductors including a positive voltage output and a negative auxiliary voltage input and a zero potential point connected to the output electrode, a first diode having an anode and a cathode, the anode being connected to the positive auxiliary voltage referenced to the negative voltage busbar and the cathode being connected to the positive auxiliary voltage input of the upper gate driver, and a first capacitor connected between the positive auxiliary voltage input of the upper gate driver and the zero potential point, a second diode having an anode to a cathode, the anode being connected to the negative auxiliary voltage input of the upper gate driver and the cathode being connected to the negative auxiliary voltage referenced to the positive busbar, and a second capacitor connected between the negative auxiliary voltage input and the zero potential point of the upper gate driver.

* * * * *